(12) United States Patent
Yamamoto

(10) Patent No.: US 11,221,197 B2
(45) Date of Patent: Jan. 11, 2022

(54) GAS GENERATOR

(71) Applicant: DAICEL CORPORATION, Osaka (JP)

(72) Inventor: Koji Yamamoto, Tokyo (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 17/057,586

(22) PCT Filed: Apr. 26, 2019

(86) PCT No.: PCT/JP2019/018034
§ 371 (c)(1),
(2) Date: Nov. 20, 2020

(87) PCT Pub. No.: WO2019/225298
PCT Pub. Date: Nov. 28, 2019

(65) Prior Publication Data
US 2021/0190463 A1 Jun. 24, 2021

(30) Foreign Application Priority Data

May 22, 2018 (JP) .............................. JP2018-098226

(51) Int. Cl.
*F42B 3/04* (2006.01)
(52) U.S. Cl.
CPC ..................................... *F42B 3/04* (2013.01)
(58) Field of Classification Search
CPC .... F42B 3/06; F42B 3/04; F42B 3/045; B60R 21/264; C06D 5/00
See application file for complete search history.

(56) References Cited

U.S. PATENT DOCUMENTS

| 5,806,887 A * | 9/1998 | Tanaka | F42B 3/04 |
| | | | 280/741 |
| 9,452,729 B2 * | 9/2016 | Bierwirth | B60R 21/261 |
| 10,549,714 B2 * | 2/2020 | Prima | F42B 3/04 |

FOREIGN PATENT DOCUMENTS

| EP | 1568547 A1 | 8/2005 |
| WO | WO 2013/008316 A1 | 1/2013 |

OTHER PUBLICATIONS

International Search Report, dated Jul. 9, 2019, for International Application No. PCT/JP2019/018034, with an English translation.

(Continued)

*Primary Examiner* — Joshua T Semick
(74) *Attorney, Agent, or Firm* — Birch, Stewart, Kolasch & Birch, LLP

(57) ABSTRACT

A gas generator including a housing, an igniter disposed inside the housing, a combustion chamber accommodating the igniter, a gas discharge port provided in the housing, and a filter having a cylindrical shape and disposed between the combustion chamber and the gas discharge port. The filter is positioned inside the housing such that a portion of at least one end surface of two end surfaces in an axial direction of the filter is supported by contact, an outer area positioned outward in a radial direction of the portion that is supported by contact is adjacent to a predetermined space, and a predetermined outer peripheral area of an outer peripheral surface of the filter near the at least one end surface is supported by contact. According to such a configuration, it is possible to suppress a short path of combustion gas in a gas generator equipped with a filter.

15 Claims, 9 Drawing Sheets

(56) References Cited

OTHER PUBLICATIONS

Written Opinion of the International Searching Authority, dated Jul. 9, 2019, for International Application No. PCT/JP2019/018034, with an English tranlslation.

\* cited by examiner

GAS GENERATOR

TECHNICAL FIELD

The present invention relates to a gas generator configured to burn a gas generating agent by actuation of an igniter, thereby generating combustion gas.

BACKGROUND ART

In a gas generator configured to burn a gas generating agent with which a combustion chamber is filled, thereby generating combustion gas, and to emit the combustion gas to the outside, a filter may be used to filter and cool combustion gas generated by burning the gas generating agent by actuation of an igniter. For example, Patent Document 1 discloses a configuration in which, in a gas generator including, in a housing, a first combustion chamber accommodating a first igniter and a gas generating agent to be burned by the first igniter and a second combustion chamber accommodating a second igniter and a gas generating agent to be burned by a second igniter, and configured to discharge combustion gas generated in each of the combustion chambers from a common gas discharge port provided in the housing, a filter having a cylindrical shape and surrounding an outer periphery of the combustion chamber is disposed between each of the combustion chambers and the gas discharge port.

Further, Patent Document 2 discloses a configuration in which, in a gas generator including a first combustion chamber and a second combustion chamber in a housing, and configured to respectively discharge a combustion gas generated in each of the combustion chambers from a first gas discharge port and a second gas discharge port provided in the housing correspondingly to each of the combustion chambers, a filter having a cylindrical shape and surrounding an outer periphery of the combustion chamber is disposed between each of the combustion chambers and the gas discharge port corresponding to the combustion chamber.

CITATION LIST

Patent Document

Patent Document 1: EP 1,568,547 A
Patent Document 2: WO 2013/008316

SUMMARY OF INVENTION

Technical Problem

In the gas generator described in Patent Document 1, a filter (first filter) surrounding the first combustion chamber is positioned inside the housing by contact between an upper end surface of the filter and a top surface portion of the housing, contact between a lower end surface of the filter and a divider, and contact between an inner peripheral surface of the filter near the lower end surface and a second cylindrical extending portion of the divider. However, positioning by an outer peripheral surface of the filter coming into contact with another member is not carried out. As a result, when the gas generating agent with which the first combustion chamber is filled is burned by the first igniter and combustion gas is generated in the first combustion chamber, thereby causing a force outward in a radial direction to act on the filter, the filter readily deforms into a shape that bulges outward in the radial direction. In association therewith, a gap may be formed between the upper end surface of the filter and the top surface portion of the housing, between the lower end surface of the filter and the divider, or between the inner peripheral surface of the filter positioned on the lower end side and the second cylindrical extending portion. As a result, the concern exists that a so-called "short path" may occur by which a portion of the combustion gas passes through the gap described above and reaches the gas discharge port without passing through the filter.

A short path such as described above may also occur in the gas generator described in Patent Document 2. That is, in the gas generator described in Patent Document 2, the filter (first filter 38) disposed between the first combustion chamber and the first gas discharge port is not supported by contact by another member at an outer peripheral surface near an upper end surface thereof. Thus, when combustion gas is generated in the first combustion chamber, thereby causing a force outward in a radial direction to act on the filter, the possibility exists that a gap may be generated between an upper end surface of the filter and a partition wall member (first ceiling wall portion 14B), resulting in the concern that a short path may occur by which the combustion gas passing through the gap reaches the first gas discharge port as is.

In light of circumstances such as described above, an object of the present invention is to provide a technique capable of suppressing a short path of combustion gas in a gas generator equipped with a filter.

Solution to Problem

To solve the problems described above, in a gas generator according to the present invention, a filter is positioned inside a housing and thus, when a gas generating agent with which a combustion chamber is filled is burned by an igniter, causing a force outward in a radial direction to act on the filter, it is possible to suppress deformation of the filter outward in the radial direction and a short path due to the deformation, and remove combustion residue from combustion gas that enters a gap between at least one end surface of the filter and another member configured to support a portion of the end surface by contact.

Specifically, according to the present invention, a gas generator includes a housing, an igniter disposed inside the housing, a combustion chamber accommodating the igniter and configured to be filled with a gas generating agent to be combusted by the igniter, a gas discharge port provided in the housing and configured to allow an inside and an outside of the housing to communicate with each other, and a filter having a cylindrical shape, including the combustion chamber in an interior thereof, and disposed between the combustion chamber and the gas discharge port. Then, the filter is positioned inside the housing such that a portion of at least one end surface of two end surfaces in an axial direction of the filter is supported by contact, an outer area of the at least one end surface positioned outward in a radial direction of the portion that is supported by contact is adjacent to a predetermined space, and a predetermined outer peripheral area of an outer peripheral surface of the filter near the at least one end surface is supported by contact.

In the gas generator described above, when the gas generating agent is burned by actuation of the igniter, a pressure inside the combustion chamber rises as combustion gas is generated in the combustion chamber. As a result, a force that attempts to deform the filter outward in the radial direction acts on the filter having a cylindrical shape and disposed between the combustion chamber and the gas discharge port. Here, in the filter according to the present invention, a predetermined outer peripheral area near at least one end surface of the two end surfaces in the axial direction (hereinafter, may also be referred to as "predetermined end surface") is supported by contact inside the housing, making it possible to suppress deformation of the filter outward in the radial direction. Further, in addition to the predetermined outer peripheral area near the predetermined end surface described above being supported by contact inside the housing, a portion of the predetermined end surface is also supported by contact inside the housing, thereby ensuring the positioning of the filter and thus making it possible to suppress a shift in position of the predetermined end surface even when a force that causes deformation outward in the radial direction acts on the filter in association with the pressure rise inside the combustion chamber. As a result, a gap is less likely to occur between the predetermined end surface described above and the other member configured to support a portion of the predetermined end surface by contact. Note that even in a case where a slight gap occurs between the predetermined end surface described above and the other member configured to support a portion of the predetermined end surface by contact, a flow of the combustion gas entering the gap is hindered by a contacting portion between the predetermined outer peripheral area and the other member configured to support the predetermined outer peripheral area by contact, making it possible to suppress the occurrence of a short path by which the combustion gas entering the gap described above reaches the gas discharge port as is. Furthermore, in the gas generator according to the present invention, the filter is positioned with the outer area, positioned outward in the radial direction of the area where the portion of the predetermined end surface described above is supported by contact, being adjacent to the predetermined space. Thus, the combustion residue contained in the combustion gas entering the gap described above can be captured in the predetermined space. That is, the combustion gas entering the gap described above flows substantially outward in the radial direction along the predetermined end surface described above, and thus passes through the gap described above and subsequently collides with the other member configured to support the predetermined outer peripheral area by contact. Thus, when the combustion gas collides with the other member configured to support the predetermined outer peripheral area by contact, the combustion residue contained in the combustion gas is separated from the combustion gas and accommodated in the predetermined space. As a result, even in a case where the combustion gas enters the gap described above, it is possible to suppress the combustion residue contained in the combustion gas from reaching the gas discharge port as is as well.

Here, in the gas generator according to the present invention, the predetermined space may be formed adjacent to the outer along a member that comes into contact with the predetermined outer peripheral area of the filter. In this case, an area near an outer edge portion of the above-described predetermined end surface of the filter serves as the outer area and is adjacent to the predetermined space in the axial direction of the filter. Thus, even in a case where a slight gap occurs between the above-described predetermined end surface of the filter and the other member configured to support a portion of the predetermined end surface by contact, and the combustion gas enters the gap, when the combustion gas collides with the other member configured to support the predetermined outer peripheral area of the filter by contact, the combustion residue separated from the combustion gas can be more reliably captured in the predetermined space.

Next, the gas generator according to the present invention may be configured to further include a partition wall member dividing a space inside the housing into a first combustion chamber serving as the combustion chamber and positioned on a first end side in an axial direction of the housing, and a second combustion chamber positioned on a second end side in the axial direction of the housing and configured to be filled with a gas generating agent, and a communication portion provided to the partition wall member and configured to allow the first combustion chamber and the second combustion chamber to communicate with each other. In this case, the igniter may be accommodated in the first combustion chamber as a first igniter. On the other hand, the second combustion chamber may accommodate a second igniter. Further, the filter may be supported, by contact by the partition wall member, at an end surface side thereof positioned on the second end side in the axial direction of the housing, and disposed between the first combustion chamber and the gas discharge port. Then, the partition wall member may be configured to include a protruding portion protruding toward the second combustion chamber and thus causing the predetermined space to be adjacent to the outer area of an end surface of the filter on the second end side, and a peripheral wall portion that comes into contact with the predetermined outer peripheral area near the end surface of the filter on the second end side.

In a dual-type gas generator configured as described above, the gas generating agent with which the first combustion chamber is filled is burned by the first igniter, and the gas generating agent with which the second combustion chamber is filled is burned by the second igniter. The gas generating agent with which the first combustion chamber is filled and the gas generating agent with which the second combustion chamber is filled may be gas generating agents of a same type, a same shape, and a same size, or may be of different types, different shapes, and different sizes. The types of gas generating agents to be employed in the respective combustion chambers may be selected as appropriate in accordance with emission characteristics of the combustion gas of the gas generator. Here, a partition wall member that forms the first combustion chamber and the second combustion chamber as spaces isolated from each other, in principle, is disposed inside the housing. With this partition wall member, the gas generating agent with which each combustion chamber is filled can be prevented from being burned by the action of the non-corresponding igniter, and thus the combustion of the corresponding gas generating agent by each igniter is readily controlled as desired.

On the other hand, a communication portion is provided to the partition wall member and, at this point, the first combustion chamber and the second combustion chamber are not in isolated states. This is because the communication portion is utilized to move the combustion gas generated by combustion from the second combustion chamber to the first combustion chamber. In the gas generator described above, while the first combustion chamber is connected to the outside via the gas discharge port, the second combustion chamber is not directly connected to the outside via the gas discharge port. That is, in the gas generator described above, the combustion gas generated by the combustion of the gas generating agent in the first combustion chamber is discharged to the outside via the gas discharge port. However, the combustion gas generated by the combustion of the gas generating agent in the second combustion chamber is temporarily moved into the first combustion chamber via the communication portion and then discharged to the outside from the gas discharge port. The generation of the flow of the combustion gas assumed in this way makes it possible to exhibit designed emission characteristics as a gas generator.

Further, a filter having a cylindrical shape is disposed between the first combustion chamber and the gas discharge port, and thus the combustion gas generated by the combustion of the gas generating agent in the first combustion chamber and the combustion gas generated by the combustion of the gas generating agent in the second combustion chamber and moved to the first combustion chamber via the communication portion are, in principle, filtered and cooled by the filter and subsequently discharged to the outside via the gas discharge port.

Here, when the gas generating agent with which the first combustion chamber is filled is burned, thereby generating combustion gas, and when the combustion gas generated by the gas generating agent being burned in the second combustion chamber is moved to the first combustion chamber via the communication portion, the pressure inside the first combustion chamber rises, causing a force that attempts to deform the filter outward in the radial direction to occur. In response, in the gas generator described above, a portion of the end surface (corresponding to the predetermined end surface described above) of the two end surfaces of the filter that is positioned on the second end side in the axial direction of the housing is supported by contact by the partition wall member, and the predetermined outer peripheral area near the predetermined end surface is supported by contact by the peripheral wall portion of the partition wall member, thereby positioning the filter inside the housing. Therefore, when the force described above acts on the filter, a shift in position of the above-described predetermined end surface of the filter is suppressed. As a result, a gap is unlikely to occur between the predetermined end surface described above and the partition wall member configured to support a portion of the predetermined end surface by contact. Note that even in a case where a slight gap occurs between the predetermined end surface described above and the partition wall member configured to support a portion of the predetermined end surface by contact, the flow of the combustion gas entering the gap is hindered by a contacting portion between the predetermined outer peripheral area and the peripheral wall portion of the partition wall member configured to support the predetermined outer peripheral area by contact. This makes it possible to suppress the occurrence of a short path by which the combustion gas entering the gap described above reaches the gas discharge port as is as well. Furthermore, in the gas generator described above, a predetermined space is formed between the outer area of the above-described predetermined end surface of the filter and the protruding portion of the partition wall member, and thus the combustion residue contained in the combustion gas entering the gap described above is captured in the predetermined space. This makes it possible to suppress the combustion residue contained in the combustion gas from reaching the gas discharge port as is as well, even in a case where the combustion gas enters the gap described above.

Note that, in a dual-type gas generator in which a space inside the housing is divided by a partition wall member into a first combustion chamber positioned on a first end side in an axial direction of the housing, and a second combustion chamber positioned on a second end side in the axial direction of the housing, the housing may include a housing protruding portion protruding outward in the axial direction of the housing and thus causing the predetermined space to be adjacent to the outer area of an end surface of the two end surfaces of the filter that is positioned on the first end side in the axial direction of the housing, and a housing peripheral wall portion that comes into contact with the predetermined outer peripheral area near the end surface of the filter on the first end side. In other words, the filter may be positioned inside the housing with the end surface of the two end surfaces of the filter that is positioned on the first end side in the axial direction of the housing serving as the predetermined end surface described above.

According to the gas generator described above, when a force is generated that attempts to deform the filter outward in the radial direction, the predetermined outer peripheral area of the filter is supported by contact by the housing peripheral wall portion, making it possible to suppress deformation of the filter outward in the radial direction. Furthermore, in addition to the predetermined outer peripheral area of the filter being supported by contact by the housing peripheral wall portion, a portion of the end surface on the first end side of the filter is supported by contact by the housing, making it possible to suppress a shift in position of the end surface of the filter on the first end side as well. As a result, a gap is unlikely to occur between the end surface of the filter on the first end side and the housing configured to support by contact a portion of the end surface. Further, even in a case where a slight gap occurs between the end surface of the filter on the first end side and the housing configured to support a portion of the end surface by contact, the flow of the combustion gas entering the gap is hindered by a contacting portion between the predetermined outer peripheral area of the filter and the housing peripheral wall portion, making it possible to suppress the occurrence of a short path by which the combustion gas entering the gap described above reaches the gas discharge port as is. Furthermore, in the gas generator described above, a predetermined space is formed between the outer area of the end surface of the filter on the first end side and the housing protruding portion, and thus the combustion residue contained in the combustion gas entering the gap described above is captured in the predetermined space. This makes it possible to suppress the combustion residue contained in the combustion gas from reaching the gas discharge port as is as well, even in a case where the combustion gas enters the gap described above.

Further, in a dual-type gas generator in which the space inside the housing is divided by a partition wall member into a first combustion chamber serving as the combustion chamber and positioned on the first end side in the axial direction of the housing, and a second combustion chamber positioned on the second end side in the axial direction of the housing and configured to be filled with a gas generating agent, the filter may be positioned inside the housing with each of the two end surfaces of the filter serving as the predetermined end surface described above. For example, while the housing includes the housing protruding portion protruding outward in an axial direction of the housing and thus causing the predetermined space to be adjacent to the outer area of the end surface of the filter on the first end side, and the housing peripheral wall portion that comes into contact with the predetermined outer peripheral area near the end surface of the filter on the first end side, the partition wall member may include a protruding portion protruding toward the second combustion chamber and thus causing the predetermined space to be adjacent to the outer area of the end surface of the filter on the second end side, and a peripheral wall portion that comes into contact with the predetermined outer peripheral area near the end surface of the filter on the second end side. When the filter is thus positioned inside the housing and a force is generated that attempts to deform the filter outward in the radial direction, it is possible to further suppress deformation of the filter and more reliably suppress the occurrence of a short path and emission of the combustion residue to the outside.

Note that, in a single-type gas generator in which only one combustion chamber is formed inside the housing, the filter may be supported by contact by the housing on at least one end surface side and disposed between the combustion chamber and the gas discharge port. In that case, the housing may include a housing protruding portion protruding outward of the housing and thus causing the predetermined space to be adjacent to the outer area of the at least one end surface of the filter, and a housing peripheral wall portion that comes into contact with the predetermined outer peripheral area near the at least one end surface of the filter. When the filter is thus positioned inside the housing, even in a single-type gas generator in which only one combustion chamber is formed inside the housing, when a force is generated that attempts to deform the filter outward in the radial direction, it is possible to suppress deformation of the filter and suppress the occurrence of a short path and discharge of the combustion residue to the outside.

Here, in the gas generator described above, the predetermined space may be formed intermittently in the peripheral direction of the filter. However, from the viewpoint of more reliably removing the combustion residue contained in the combustion gas, the predetermined space may be continuously formed in the peripheral direction of the filter, that is, formed in an annular shape in the peripheral direction of the filter.

Further, in the gas generator described above, from the viewpoint of more reliably suppressing deformation of the filter outward in the radial direction when a force is generated that attempts to deform the filter outward in the radial direction, a method of further supporting by contact an area of the outer peripheral surface of the filter other than the predetermined outer peripheral area inside the housing is also conceivable. That is, a method of positioning the filter inside the housing in a way that ensures that a gap is not formed between the outer peripheral surface of the filter and the housing is conceivable. Nevertheless, according to such a configuration, while deformation of the filter outward in the radial direction can be suppressed, the combustion gas generated inside the combustion chamber when the gas generating agent is burned by actuation of the igniter readily flows intensively to an area of the filter near the gas discharge port, making it difficult to effectively utilize an area of the filter other than that near the gas discharge port. Thus, the filtering and cooling of the combustion gas by the filter may be ineffective. Here, in the gas generator according to the present invention, a gap having an annular shape and connected to the gas discharge port may be formed between at least a portion of an area of the outer peripheral surface of the filter other than the predetermined outer peripheral area and the housing. According to such a configuration, deformation of the filter outward in the radial direction can be suppressed while ensuring a filtering effect and a cooling effect of the combustion gas by the filter.

Advantageous Effects of Invention

According to the present invention, it is possible to effectively suppress a short path of combustion gas in a gas generator equipped with a filter.

DESCRIPTION OF EMBODIMENTS

A gas generator according to an embodiment of the present invention will be described below with reference to the drawings. Note that configurations of the following embodiment are provided as examples, and the present invention is not limited to the configurations of the embodiment.

First Example

Figure 1:
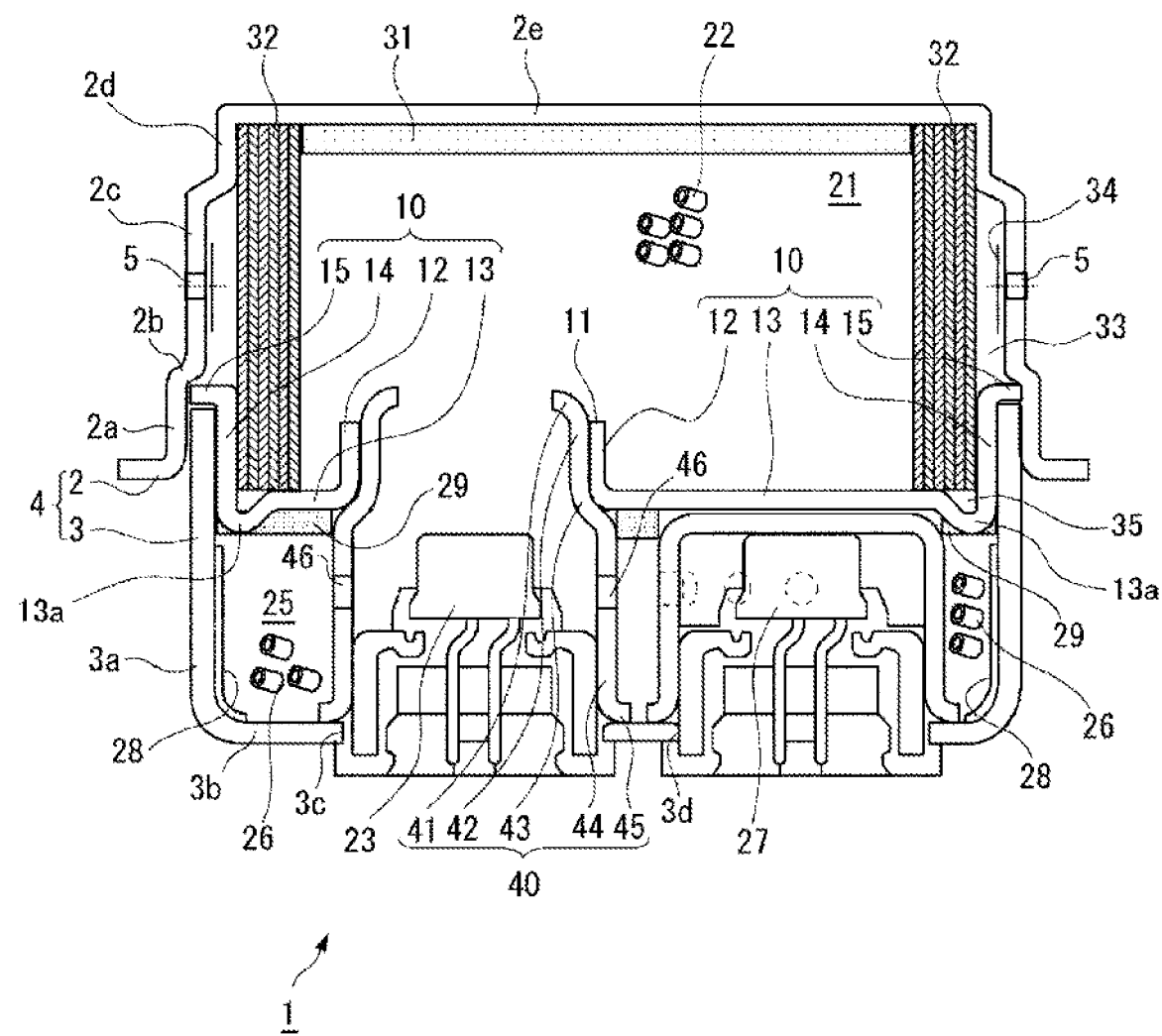
FIG. 1 is a drawing illustrating a schematic configuration of a gas generator in a first example.

FIG. 1 is a cross-sectional view in a height direction of a gas generator 1. The gas generator 1 is configured to burn a gas generating agent with which a housing 4 formed by an upper shell 2 and a lower shell 3 is filled and to emit combustion gas, which is a combustion product thereof. The upper shell 2 includes a large diameter peripheral wall portion 2c, a small diameter peripheral wall portion 2d, and a top surface portion 2e, which form an internal space having a concave shape. The top surface portion 2e, together with a bottom surface portion 3b of the lower shell 3 described later, has a substantially circular shape in a top view. The large diameter peripheral wall portion 2c and the small diameter peripheral wall portion 2d surround a periphery of the top surface portion 2e, and form a wall surface having an annular shape and extending substantially perpendicularly from the top surface portion 2e. An internal space of the upper shell 2 is a space filled with a first gas generating agent 22 as described later. The top surface portion 2e is connected to a first end side (upper side in FIG. 1) of the small diameter peripheral wall portion 2d, and the large diameter peripheral wall portion 2c having a diameter greater than that of the small diameter peripheral wall portion 2d is connected to a second end side (lower side in FIG. 1). Further, the second end side (lower side in FIG. 1) of the large diameter peripheral wall portion 2c serves as an opening of the upper shell 2. Then, on the second end side of the large diameter peripheral wall portion 2c, a mating wall portion 2a and an abutting portion 2b are provided in this order from the opening. A radius of an internal space formed by the mating wall portion 2a is greater than a radius of an internal space formed by the large diameter peripheral wall portion 2c, and the mating wall portion 2a connects to the large diameter peripheral wall portion 2c with the abutting portion 2b interposed therebetween.

The lower shell 3 includes a peripheral wall portion 3a and the bottom surface portion 3b which form an internal space having a concave shape. The peripheral wall portion 3a surrounds a periphery of the bottom surface portion 3b, and forms a wall surface having an annular shape and extending substantially perpendicularly from the bottom surface portion 3b. An internal space of the lower shell 3 is a space filled with a second gas generating agent 26 as described later. The first end side (upper side in FIG. 1) of the peripheral wall portion 3a serves as an opening of the lower shell 3, and the bottom surface portion 3b is connected to the second end side (lower side in FIG. 1). Then, an outer diameter of the peripheral wall portion 3a is substantially the same as an inner diameter of the mating wall portion 2a of the upper shell 2. Further, the bottom surface portion 3b of the lower shell 3 is provided with a fitting hole 3c and a fitting hole 3d in which a first igniter 23 and a second igniter 27 are fixed, respectively.

A vertical partition wall member 10 and an inner cylindrical member 40 are disposed inside the housing 4 between the upper shell 2 and the lower shell 3. The vertical partition wall member 10 and the inner cylindrical member 40 work together to divide a space inside the housing 4 into a first combustion chamber 21 positioned on the first end side (upper side in FIG. 1) in the axial direction of the housing 4 and filled with the first gas generating agent 22, and a second combustion chamber 25 positioned on the second end side (lower side in FIG. 1) in the axial direction of the housing 4 and filled with the second gas generating agent 26.

The inner cylindrical member 40 is a cylindrical member having a space in an interior thereof, and includes a terminating end portion 45 joined to the bottom surface portion 3b of the lower shell 3, a peripheral wall portion 44 extending upward from the terminating end portion 45, a connecting portion 43 connected to the peripheral wall portion 44, a mating wall portion 42 connected to the connecting portion 43, extending further upward, and having a diameter of an inner space that is less than that of the peripheral wall portion 44, and a terminating end portion 41 that connects to the mating wall portion 42, bends and terminates on the internal space side, and forms an opening by an end edge portion thereof. As illustrated in FIG. 1, when the inner cylindrical member 40 is joined to the bottom surface portion 3b, the peripheral wall portion 44 and the mating wall portion 42 extend substantially perpendicularly with respect to the bottom surface portion 3b toward the top surface portion 2e, causing the terminating end portion 45 to come into contact with the lower shell 3 near the fitting hole 3c and the first igniter 23 fixed to the fitting hole 3c to be accommodated in the interior of the inner cylindrical member 40.

The vertical partition wall member 10 includes a terminating end portion 15, a mating wall portion 14 extending from the terminating end portion 15 along the peripheral wall portion 3a of the lower shell 3, a dividing wall portion 13 that connects to the mating wall portion 14 and divides the inside of the housing 4 substantially into upper and lower spaces, and a peripheral wall portion 12 that connects to the dividing wall portion 13 and extends toward the top surface portion 2e of the upper shell 2. Note that an opening is formed in the vertical partition wall member 10 by an open end portion 11 of the peripheral wall portion 12. Then, as illustrated in FIG. 1, when the terminating end portion 15 is placed on a terminating end surface of the peripheral wall portion 3a of the lower shell 3 and the vertical partition wall member 10 is attached to the housing 4, the mating wall portion 42 of the inner cylindrical member 40 is inserted into the opening of the vertical partition wall member portion 10 formed by the open end portion 11. As a result, the vertical partition wall member 10 is disposed inside the housing 4 while supported by the peripheral wall portion 3a of the lower shell 3 and the inner cylindrical member 40 and, in this disposed state, the dividing wall portion 13 forms a wall surface substantially parallel to the top surface portion 2e of the upper shell 2 and the bottom surface portion 3b of the lower shell 3.

Further, a communication hole 46 is provided in the peripheral wall portion 44 of the inner cylindrical member 40, and the communication hole 46 (corresponding to the "communication portion" according to the present invention) allows the first combustion chamber 21 and the second combustion chamber 25 formed by being divided by the vertical partition wall member 10 and the inner cylindrical member 40 to communicate with each other. The communication hole 46 is closed by a closing member (not illustrated), and thus does not open when the first gas generating agent 22 is burned and opens when the second gas generating agent 26 is burned. Note that the method for causing the first combustion chamber 21 and the second combustion chamber 25 to communicate with each other is not limited to a method of providing a hole in the peripheral wall portion 44 of the inner cylindrical member 40, and may be changed as appropriate as long as the internal space of the inner cylindrical member 40 and the second combustion chamber 25 can communicate with each other. Further, the first combustion chamber 21 and the second combustion chamber 25 may be caused to communicate with each other by providing a communication hole in the dividing wall portion 13.

The gas generator 1 is assembled by respectively fixing the first igniter 23 and the second igniter 27 to the fitting holes 3c, 3d of the lower shell 3, and bringing the inner cylindrical member 40 into contact with the lower shell 3 and thus causing the inner cylindrical member 40 to accommodate the first igniter 23. With the inner cylindrical member 40 thus disposed, the second combustion chamber 25 is formed surrounding a periphery of the inner cylindrical member 40, and then is filled with the second gas generating agent 26. After the second combustion chamber 25 is filled with the second gas generating agent 26, the vertical partition wall member 10 is attached to the lower shell 3 and the inner cylindrical member 40. At this time, a cushion 29 for suppressing a vibration of the second gas generating agent 26 is disposed between the vertical partition wall member 10 and the second gas generating agent 26 with which the second combustion chamber 25 is filled. Further, a sheet member 28 made of resin is disposed on an inner wall surface of the peripheral wall portion 3a of the lower shell 3 in order to suppress pulverization of the second gas generating agent 26 caused by contact between the second gas generating agent 26 and the lower shell 3.

After the vertical partition wall member 10 is attached to the lower shell 3 and the inner cylindrical member 40, a filter 32 having a cylindrical shape is disposed relative to the vertical partition wall member 10, an inner side thereof is filled with the first gas generating agent 22, and the upper shell 2 is attached thereto. Note that the positioning of the filter 32 will be described later. As described above, the inner diameter of the mating wall portion 2a of the upper shell 2 is formed to be substantially the same as the outer diameter of the peripheral wall portion 3a of the lower shell 3, and thus the upper shell 2 is fitted in the lower shell 3 until the abutting portion 2b abuts against the terminating end portion 15 of the vertical partition wall member 10. With the abutting portion 2b of the upper shell 2 abutting against the terminating end portion 15, the mating wall portion 14 is mated with the peripheral wall portion 3a of the lower shell 3. Note that, in the housing 4, a contacting area of the upper shell 2 and the lower shell 3 is joined by a joining method (for example, welding or the like) favorable for moisture-proofing the gas generating agent with which the interior is filled, or the like.

Thus, in the housing 4, the internal space is divided substantially vertically into two spaces by the vertical partition wall member 10 and the inner cylindrical member 40, that is, into the first combustion chamber 21 and the second combustion chamber 25. Note that the internal space of the inner cylindrical member 40 communicates with the internal space on the upper shell 2 via the opening formed by the terminating end portion 41, thereby forming the first combustion chamber 21. In the internal space of the housing 4, the first igniter 23 and the first gas generating agent 22 are disposed in the first combustion chamber 21, and the second igniter 27 and the second gas generating agent 26 are disposed in the second combustion chamber 25. In this way, the gas generator 1 is configured as a dual-type gas generator including two igniters, that is, the first igniter 23 and the second igniter 27. Note that the first igniter 23 and the second igniter 27 are both fixed on the bottom surface portion 3b of the lower shell 3, and thus the first igniter 23 is accommodated inside the inner cylindrical member 40 in a state in which a side of the first igniter 23 is surrounded by the inner cylindrical member 40 and a top portion of the first igniter 23 does not protrude from the terminating end portion 41 of the inner cylindrical member 40 toward the upper shell 2.

Here, in the first combustion chamber 21, while the first igniter 23 is accommodated in an accommodating space formed by the inner cylindrical member 40, and a space thereabove (substantially the space above the vertical partition wall member 10) is filled with the first gas generating agent 22, the filter 32 having an annular shape is disposed surrounding the first gas generating agent 22. Further, a cushion 31 by which the first gas generating agent 22 is urged to not unnecessarily vibrate inside the first combustion chamber 21 is disposed on an inner side of the top surface portion 2e of the upper shell 2. The first gas generating agent 22 used is a gas generating agent having a relatively low combustion temperature. The first gas generating agent 22 preferably has a combustion temperature in a range of from 1000 to 1700° C. As the first gas generating agent 22, a single hole cylindrical gas generating agent including guanidine nitrate (41 wt %), basic copper nitrate (49 wt %), a binder, and an additive, for example, may be used.

The filter 32 of the present example is formed by stacking flat woven meshes made of stainless steel in the radial direction and compressing the meshes in the radial and axial directions. The filter 32 is configured to cool the combustion gas formed by the first gas generating agent 22 and collect combustion residue included in the combustion gas. Alternatively, a filter having a wire-wound-type structure, in which a wire is wound forming multiple layers on a core rod, may be used as the filter 32. Note that the filter 32 also cools the combustion gas formed by the second gas generating agent 26 with which the second combustion chamber 25 is filled, and collects the combustion residue thereof. Further, a gap 33 formed between the large diameter peripheral wall portion 2c of the upper shell 2 and the filter 32 forms a gas passage that surrounds the filter 32 and has an annular shape in the radial direction in cross-sectional view. This gap 33 allows the combustion gas to readily pass through the entire area of the filter 32, and thus effective utilization of the filter 32 and effective cooling and filtration of the combustion gas are achieved. The combustion gas flowing through the filter 32 and reaching the gap 33 reaches a gas discharge port 5 provided in the large diameter peripheral wall portion 2c. Further, to prevent moisture from entering the housing 4 from the outside, the gas discharge port 5 is closed, by an aluminum tape 34, from the interior of the housing 4 until the gas generator 1 is actuated.

Further, the second combustion chamber 25 is filled with the second gas generating agent 26 correspondingly to the second igniter 27 fixed to the fitting hole 3d of the lower shell 3. Further, similar to the first gas generating agent 22, for the second gas generating agent 26 as well, a single hole cylindrical gas generating agent including guanidine nitrate (41 wt %), basic copper nitrate (49 wt %), a binder, and an additive may be used.

According to such a configuration, the gas generator 1 can generate a relatively large amount of combustion gas by the combustion of the first gas generating agent 22 by actuation of the first igniter 23 and the combustion of the second gas generating agent 26 by actuation of the second igniter 27 and emit the combustion gas to the outside. Further, in the present example, the second igniter 27 is actuated at a predetermined timing after the actuation timing of the first igniter 23. The actuation timing of each igniter correlates to the emission timing of the combustion gas generated therein to the outside. Accordingly, the actuation timing of each igniter is determined in accordance with the emission characteristics of the combustion gas required for the gas generator 1, and an output performance of the gas generator 1 as a whole is determined thereby. Here, in the gas generator 1, when the first igniter 23 is actuated, it is assumed that the combustion gas generated by the first gas generating agent 22 being burned in the first combustion chamber 21 is cooled and filtered by the filter 32 and subsequently emitted to the outside via the gas discharge port 5. Then, when the second igniter 27 is actuated after the first igniter 23, it is assumed that the combustion gas generated by the second gas generating agent 26 being burned in the second combustion chamber 25 moves through the communication hole 46 to the first combustion chamber 21, and the combustion gas moved from the second combustion chamber 25 to the first combustion chamber 21 is cooled and filtered by the filter 32 and subsequently emitted to the outside via the gas discharge port 5. Accordingly, in the gas generator 1, the filter 32 needs to be positioned inside the housing 4 and thus cause the combustion gas generated in the first combustion chamber 21 and the combustion gas generated in the second combustion chamber 25 to appropriately pass through the filter 32.

Positioning of Filter 32

Figure 2:
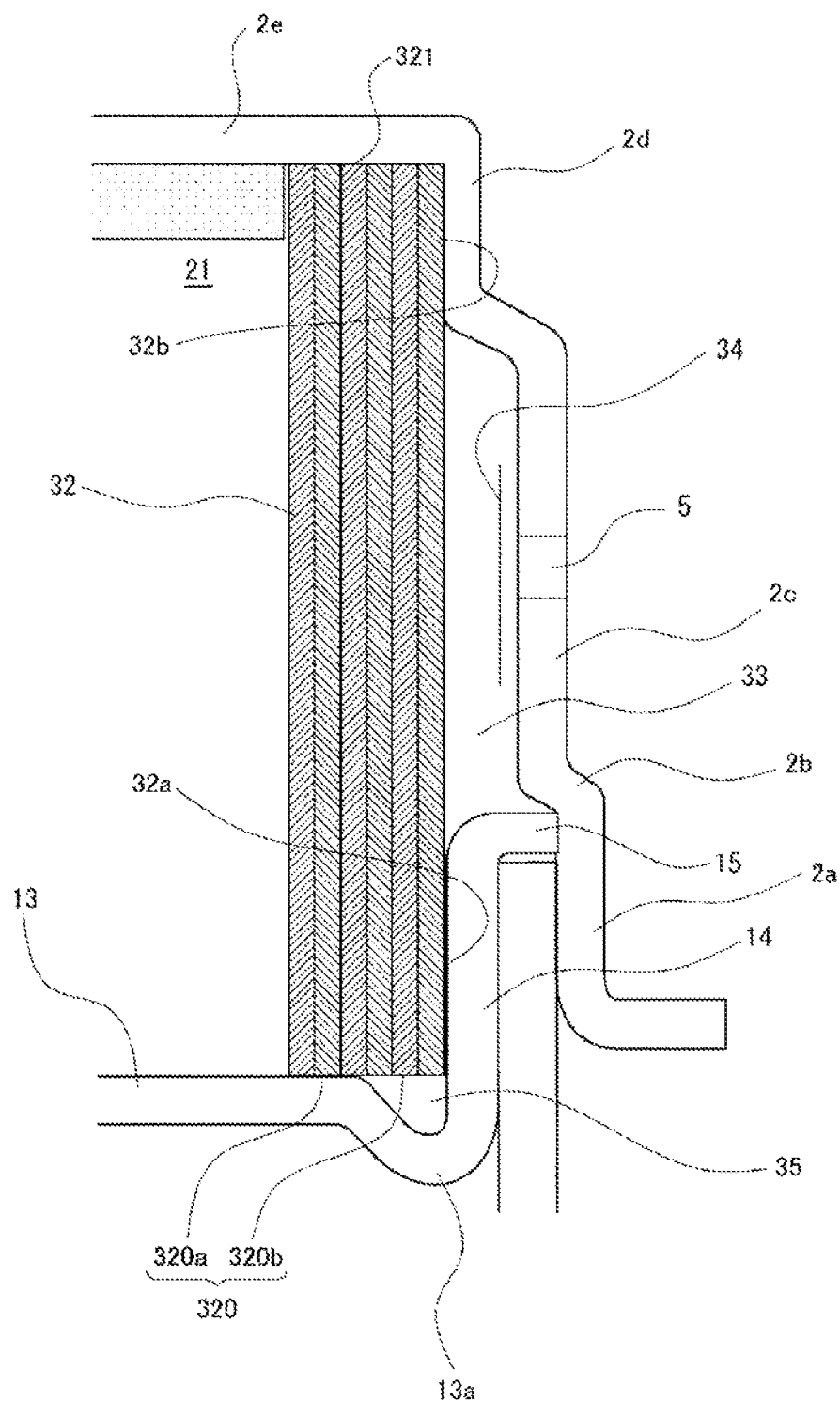
FIG. 2 is a drawing illustrating a configuration near a filter in the gas generator.
Figure 3:
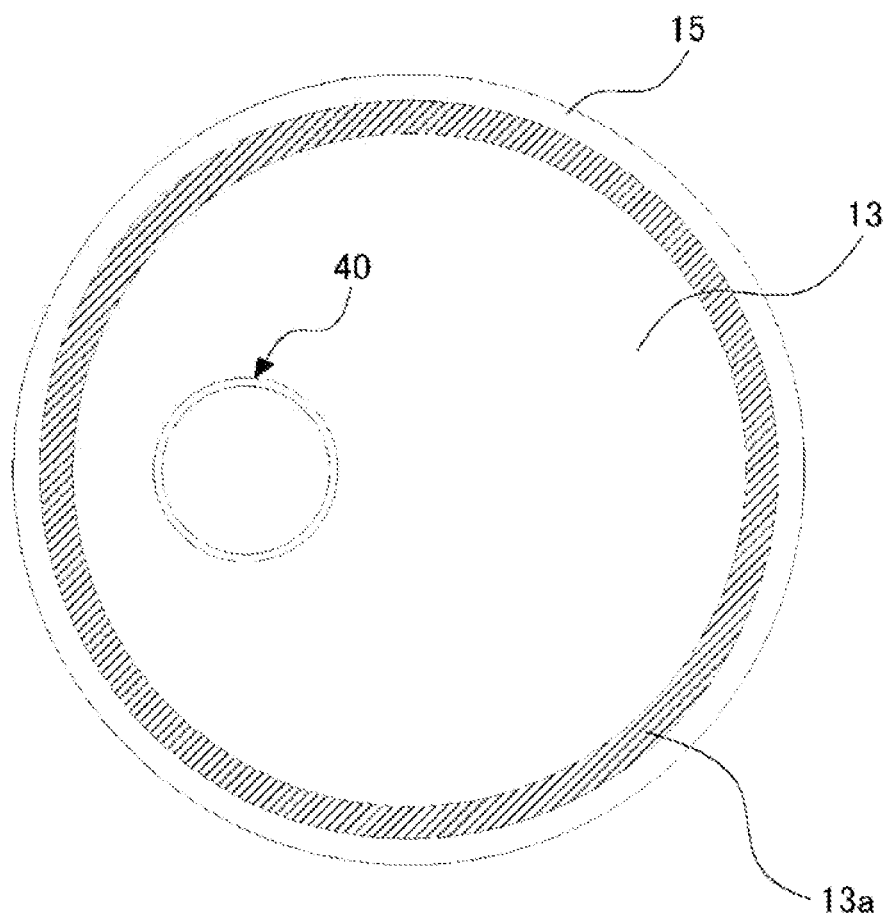
FIG. 3 is a drawing illustrating a configuration example of a protruding portion of a vertical partition wall member.

Here, in the gas generator 1 of the present example, the filter 32 is positioned inside the housing 4, and thus the combustion gas generated in the first combustion chamber 21 and the combustion gas generated in the second combustion chamber 25 appropriately pass through the filter 32. A configuration in which the filter 32 is positioned inside the housing 4 will be described on the basis of FIG. 2 and FIG. 3. FIG. 2 is a cross-sectional view in the height direction of the gas generator 1 near the filter 32. FIG. 3 is a plan view of the vertical partition wall member 10.

Figure 4:
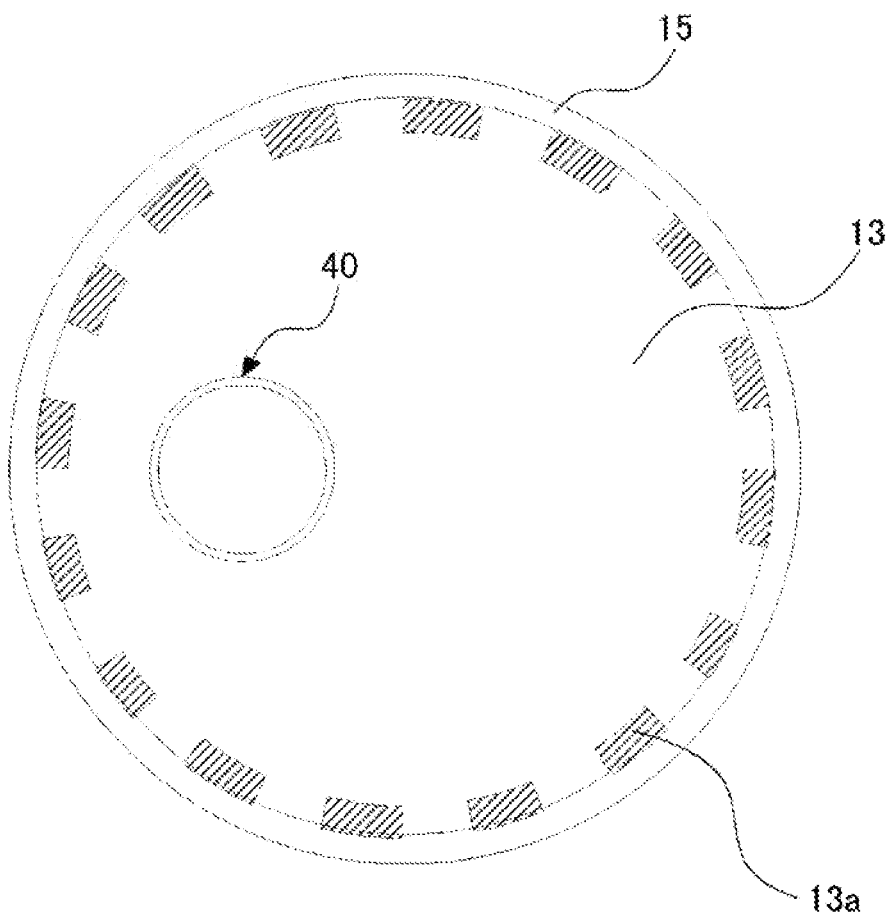
FIG. 4 is a drawing illustrating another configuration example of the protruding portion of the vertical partition wall member.

Here, the filter 32 in the present example is formed such that an outer diameter of the filter 32 is substantially the same as an inner diameter of the small diameter peripheral wall portion 2*d* of the upper shell 2 and an inner diameter of the mating wall portion (peripheral wall portion) 14 of the vertical partition wall member 10, and a length (height) of the filter 32 in the axial direction thereof is substantially the same as a size of a gap between a lower wall surface of the top surface portion 2*e* of the upper shell 2 and an upper wall surface of the dividing wall portion 13 of the vertical partition wall member 10. In a state in which the upper shell 2, the lower shell 3, and the vertical partition wall member 10 are joined, the filter 32 thus formed is supported by contact by the top surface portion 2*e* of the upper shell 2 at an upper end surface 321, which is an end surface of the filter 32 on the first end side (upper side in FIG. 2) in the axial direction, and supported by contact by the dividing wall portion 13 of the vertical partition wall member 10 at a portion (area positioned inward in the radial direction (hereinafter referred to as "inner area")) 320*a* of a lower end surface 320, which is an end surface on the second end side (lower side in FIG. 2), thereby positioning the filter 32 in a perpendicular direction (height direction) inside the housing 4. Then, in a state in which the upper shell 2, the lower shell 3, and the vertical partition wall member 10 are joined, the filter 32 is supported by contact by the small diameter peripheral wall portion 2*d* of the upper shell 2 at an upper outer peripheral area 32*b*, which is an outer peripheral area of the filter 32 near the upper end surface 321, and supported by contact by the mating wall portion 14 of the vertical partition wall member 10 at a lower outer peripheral area 32*a* (corresponding to the "predetermined outer peripheral area" according to the present invention), which is an outer peripheral area near the lower end surface 320, thereby positioning the filter 32 in a horizontal direction inside the housing 4. Further, of the lower end surface 320 of the filter 32, an area outward of the inner area 320*a* in the radial direction, that is an outer area 320*b*, which is an area near an outer edge portion of the lower end surface 320, forms a predetermined space 35 between the outer area 320*b* and a protruding portion 13*a* formed so that an outer edge portion of the dividing wall portion 13 protrudes toward the second combustion chamber 25. That is, the outer area 320*b* of the lower end surface 320 of the filter 32 is adjacent to the predetermined space 35 along the mating wall portion 14. Here, as illustrated in FIG. 3, the protruding portion 13*a* described above has an annular shape in which the outer edge portion of the dividing wall portion 13 continuously protrudes in the peripheral direction. Note that, as illustrated in FIG. 4, the protruding portion 13*a* described above may be formed by intermittently protruding the outer edge portion of the dividing wall portion 13 in the peripheral direction, or may be formed in an annular shape with different protruding amounts. Further, the predetermined space 35 is formed on an extending line of an inner peripheral surface of the mating wall portion 14.

Figure 5:
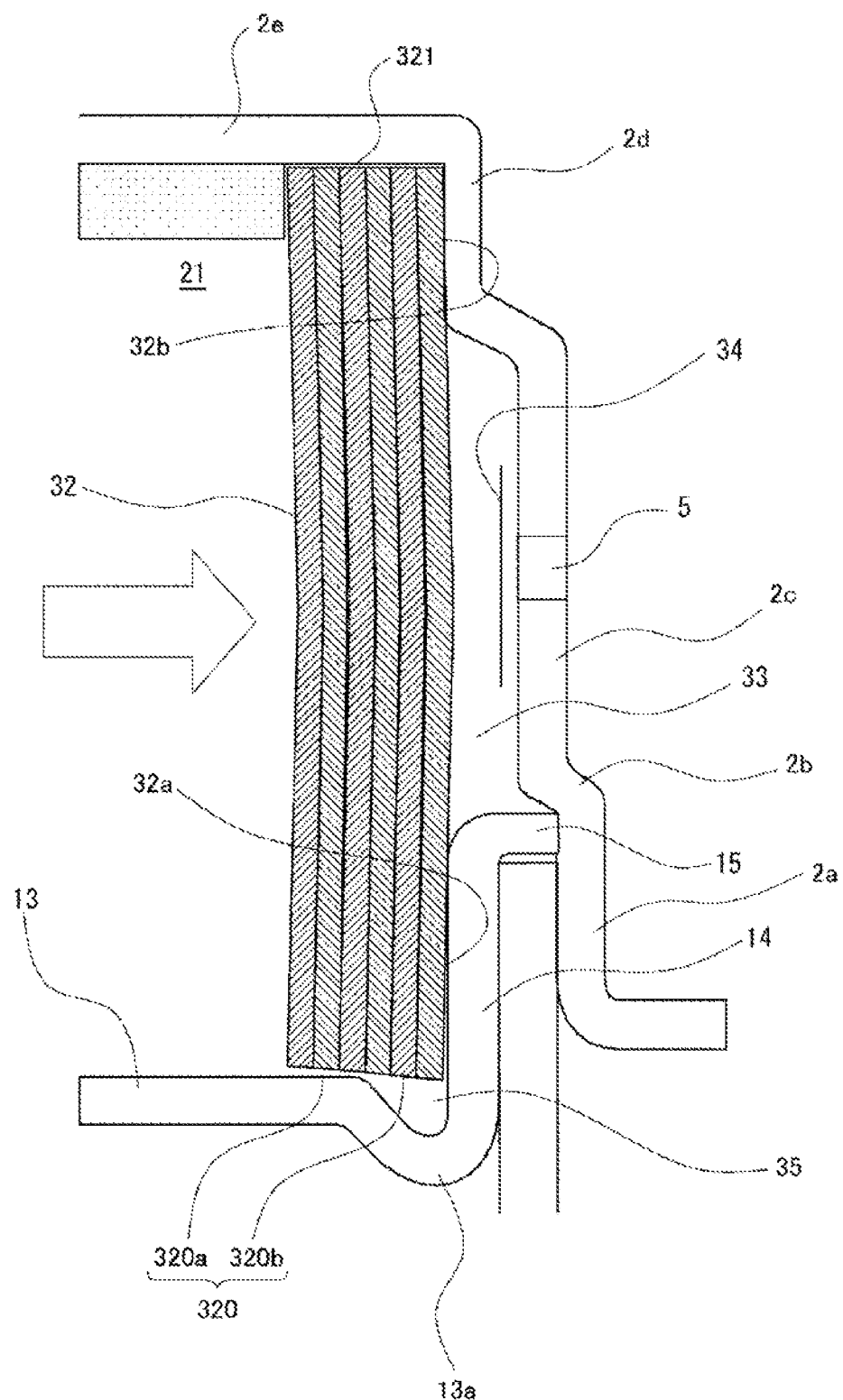
FIG. 5 is a drawing illustrating an example of deformation of the filter when a non-uniform force acts on the filter.

In the gas generator 1 in which the filter 32 is thus positioned inside the housing 4, when the first igniter 23 burns the first gas generating agent 22, thereby generating combustion gas inside the first combustion chamber 21, and when the combustion gas generated inside the second combustion chamber 25 by the second igniter 27 burning the second gas generating agent 26 moves into the first combustion chamber 21 via the communication hole 46, the pressure inside the first combustion chamber 21 rises, thereby producing a force that attempts to deform the filter 32 outward in the radial direction as illustrated by the arrow in FIG. 5. In response, in the gas generator 1 of the present example, the upper outer peripheral area 32*b* of the filter 32 is supported by contact by the small diameter peripheral wall portion 2*d* of the upper shell 2, and the lower outer peripheral area 32*a* of the filter 32 is supported by contact by the mating wall portion 14 of the vertical partition wall member 10, making it possible to suppress deformation of the filter 32 outward in the radial direction. Furthermore, in addition to the upper outer peripheral area 32*b* of the filter 32 being supported by contact by the small diameter peripheral wall portion 2*d* of the upper shell 2, and the lower outer peripheral area 32*a* being in contact with the mating wall portion 14 of the vertical partition wall member 10, the upper end surface 321 of the filter 32 is supported by contact by the top surface portion 2*e* of the upper shell 2, and the inner area 320*a* of the lower end surface 320 is supported by contact by the dividing wall portion 13 of the vertical partition wall member 10, thereby making it possible to suppress a shift in position of the upper end surface 321 and the lower end surface 320 of the filter 32 even in a case where a force that causes the filter 32 to deform outward in the radial direction due to a rise in pressure inside the first combustion chamber 21 occurs. This makes it possible to suppress the occurrence of a gap between the inner area 320*a* of the lower end surface 320 of the filter 32 and the dividing wall portion 13 of the vertical partition wall member 10. Further, when the protruding portion 13*a* described above is provided to the dividing wall portion 13 as illustrated in FIG. 3 or FIG. 4, the protruding portion 13*a* serves as a reinforcing rib, thereby increasing a rigidity of the dividing wall portion 13. This can suppress deformation of the dividing wall portion 13 by the pressure generated when the first gas generating agent 22 and the second gas generating agent 26 are burned in the first combustion chamber 21 and the second combustion chamber 25 as well. Thus, formation of a gap between the dividing wall portion 13 and the inner area 320*a* due to deformation of the dividing wall portion 13 is suppressed. This makes it possible to suppress the occurrence of a short path by which the combustion gas passes through the gap described above and reaches the gas discharge port 5 without passing through the filter 32.

When the first igniter 23 burns the first gas generating agent 22, thereby generating combustion gas inside the first combustion chamber 21, and when the combustion gas generated inside the second combustion chamber 25 by the second igniter 27 burning the second gas generating agent 26 moves into the first combustion chamber 21 via the communication hole 46, deformation of the filter 32 by a force acting on the filter 32 is not limited to being uniform as a whole, and a deformation amount of an area positioned in the middle of the two end surfaces 320, 321 in the axial direction of the filter 32 (for example, in the example illustrated in FIG. 1 and FIG. 2, an area in which an outer peripheral surface thereof is adjacent to the gap 33 described above) may be greater than that of other areas. When such non-uniform deformation occurs in the filter 32, as illustrated in FIG. 5, the filter 32 may deform with a middle portion in the axial direction of the filter 32 bulging outward in the radial direction and upper and lower areas thereof tilted inward in the radial direction. When such deformation of the filter 32 occurs, it is assumed that the inner area 320*a* of the lower end surface 320 is separated from the dividing wall portion 13 of the vertical partition wall member 10 in such a manner that the lower end surface 320 of the filter 32 is pulled diagonally upward (upper right direction in FIG. 5), generating a slight gap therebetween.

Figure 6:
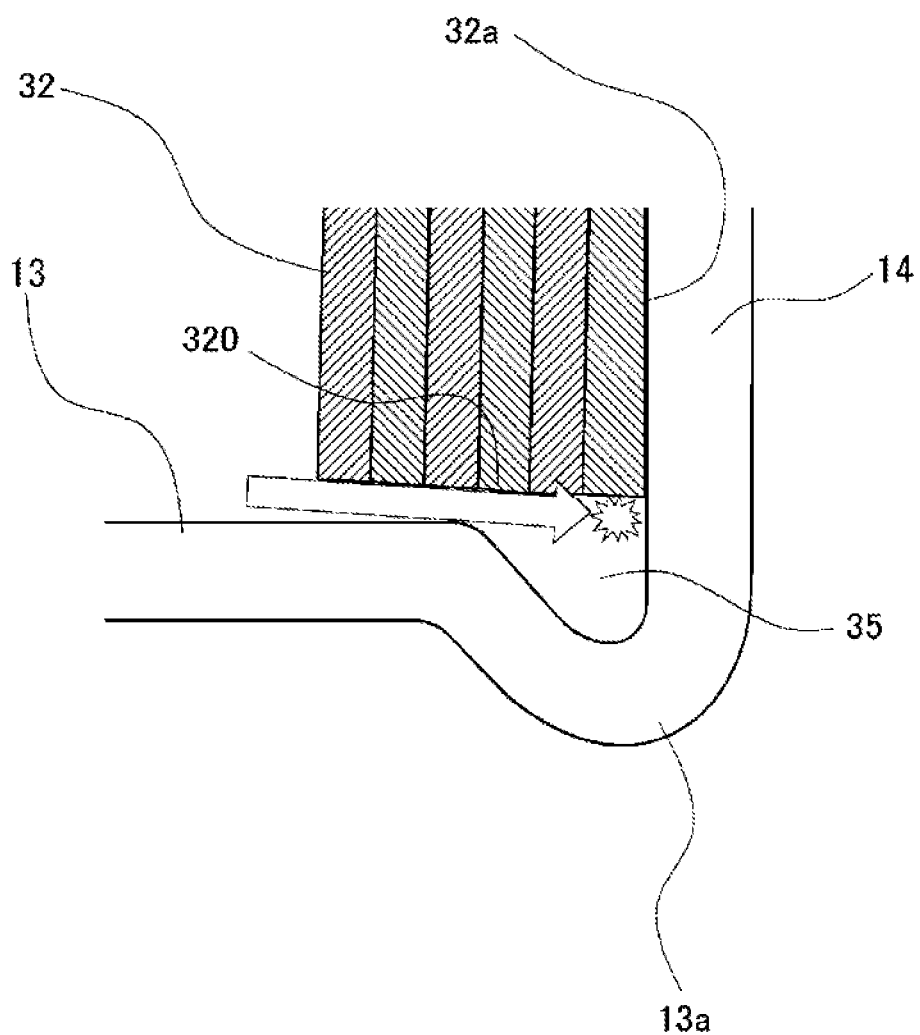
FIG. 6 is a drawing schematically illustrating a flow of combustion gas entering a gap between a lower end surface of the filter and a dividing wall portion of the vertical partition wall member.

Nevertheless, in the gas generator 1 of the present example, the lower outer peripheral area 32a of the filter 32 is supported by contact by the mating wall portion 14 of the vertical partition wall member 10 and thus, even in a case where combustion gas enters the gap between the inner area 320a of the lower end surface 320 and the dividing wall portion 13 of the vertical partition wall member 10, the flow of the combustion gas is hindered by a contacting portion between the lower outer peripheral area 32a and the mating wall portion 14. Furthermore, in the gas generator 1 of the present example, the filter 32 is positioned inside the housing 4 with the outer area 320b of the lower end surface 320 of the filter 32 adjacent to the predetermined space 35 along the mating wall portion 14 of the vertical partition wall member 10, thereby making it possible to capture the combustion residue contained in the combustion gas entering the gap between the inner area 320a and the dividing wall portion 13 in the predetermined space 35 as well. This is because, as illustrated in FIG. 6, the combustion gas entering the gap between the inner area 320a and the dividing wall portion 13 initially flows substantially outward in the radial direction along the lower end surface 320 of the filter 32, and thus the combustion gas passing through the gap collides with the mating wall portion 14 of the vertical partition wall member 10, and the combustion residue separated from the combustion gas by the collision is captured in the predetermined space 35.

Accordingly, according to the gas generator 1 in the present example, when the first igniter 23 burns the first gas generating agent 22, thereby generating combustion gas inside the first combustion chamber 21, and when the combustion gas generated inside the second combustion chamber 25 by the second igniter 27 burning the second gas generating agent 26 moves into the first combustion chamber 21 via the communication hole 46, it is possible to suppress the occurrence of a short path by which the combustion gas inside the first combustion chamber 21 passes through the gap between the lower end surface 320 of the filter 32 and the dividing wall portion 13 of the vertical partition wall member 10 and reaches the gas discharge port 5 without passing through the filter 32, and suppress, even in a case where a gap occurs, for example, the combustion residue entering the gap from reaching the gas discharge port 5 as is as well. Thus, the combustion gas generated in the first combustion chamber 21 and the combustion gas generated in the second combustion chamber 25 appropriately pass through the filter 32. Further, according to the gas generator 1 in the present example, it is not necessary to separately add components such as a coolant support for suppressing the occurrence of a short path, and thus it is possible to suppress the occurrence of a short path while suppressing an increase in the number of components.

Note that, in the gas generator 1 illustrated in the present example, while, of the outer peripheral surface of the filter 32, the lower outer peripheral area 32a serving as the predetermined outer peripheral area as well as the upper outer peripheral area 32b are supported by contact inside the housing 4, as long as the occurrence of a short path by which combustion gas passes through the gap between the lower end surface 320 of the filter 32 and the dividing wall portion 13 of the vertical partition wall member 10 and reaches the gas discharge port 5 can be suppressed, the upper outer peripheral area 32b does not necessarily need to be supported by contact inside the housing 4.

Modification Example of First Example

While, in the example described above, an example has been described in which the filter is positioned inside the housing with an inner area of the lower end surface of the two end surfaces in the axial direction of the filter supported by contact and the outer area adjacent to the predetermined space, the filter may be positioned inside the housing with an inner area of the upper end surface of the two end surfaces in the axial direction of the filter positioned inward in the radial direction supported by contact and the outer area positioned outward of the inner area in the radial direction adjacent to the predetermined space.

Figure 7:
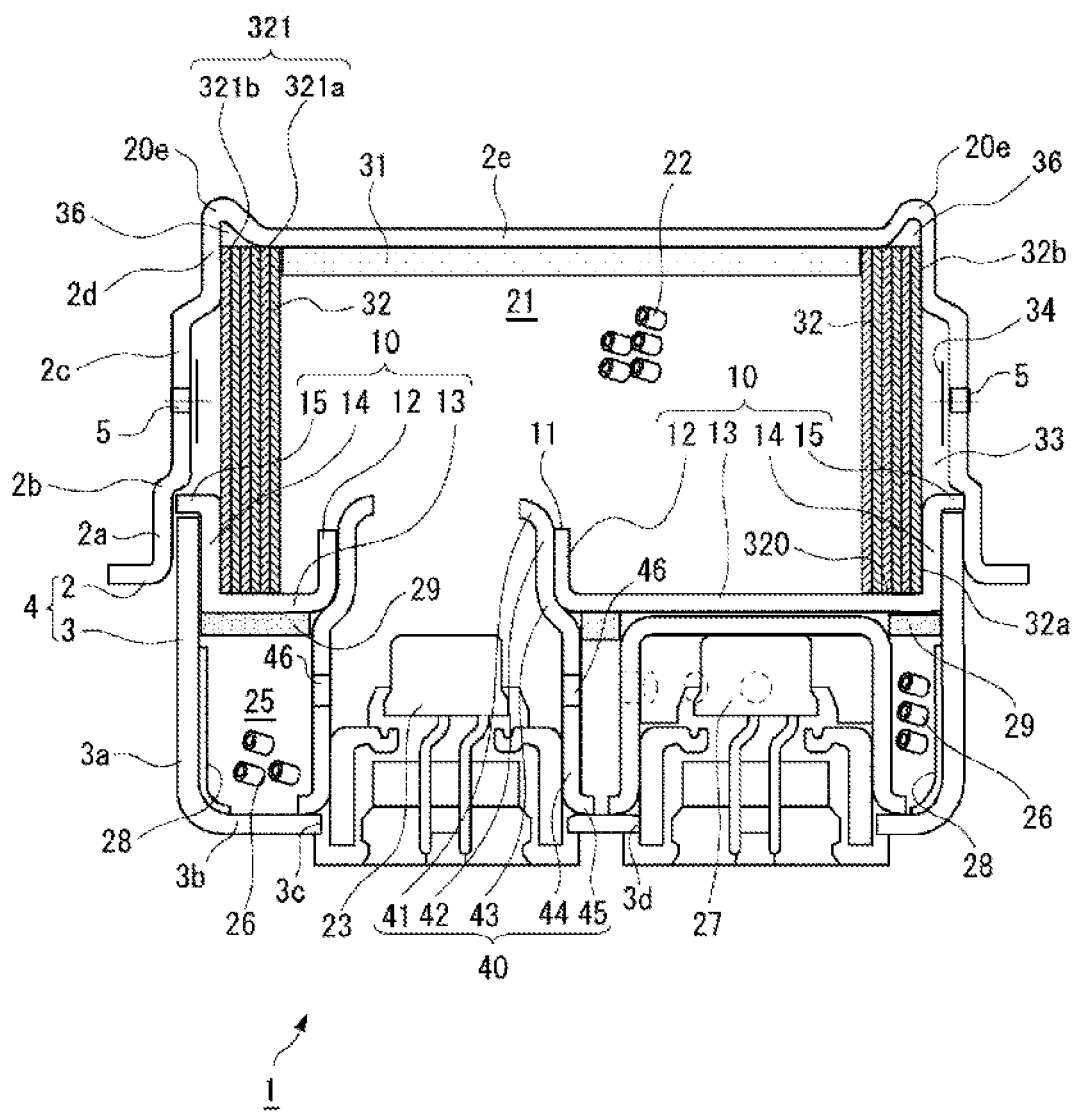
FIG. 7 is a drawing illustrating a schematic configuration of the gas generator in a modification example of the first example.

FIG. 7 is a cross-sectional view in the height direction of the gas generator 1 according to the present modification example. In the example illustrated in FIG. 7, a protruding portion is not formed on the outer edge portion of the dividing wall portion 13 of the vertical partition wall member 10, and thus substantially the entire lower end surface 320 of the two end surfaces in the axial direction of the filter 32 is supported by the dividing wall portion 13. On the other hand, a protruding portion 20e (corresponding to the "housing protruding portion" according to the present invention) protruding upward along the small diameter peripheral wall portion 2d (corresponding to the "housing peripheral wall portion" according to the present invention) is formed on the outer edge portion of the top surface portion 2e of the upper shell 2. Thus, the filter 32 is positioned inside the housing 4 with an inner area 321a, which is an area positioned inward in the radial direction of the upper end surface 321 of the filter 32, supported by contact by the top surface portion 2e of the upper shell 2 at the upper end surface 321, and an outer area 321b, which is an area positioned outward in the radial direction from the inner area 321a, adjacent to a predetermined space 36 formed between the outer area 321b and the protruding portion 20e described above. In this case, the upper outer peripheral area 32b supported by contact by the small diameter peripheral wall portion 2d near the upper end surface 321 of the filter 32 corresponds to the "predetermined outer peripheral area" according to the present invention.

According to the gas generator 1 of the present modification example, when the first igniter 23 burns the first gas generating agent 22, thereby generating combustion gas inside the first combustion chamber 21, and when the combustion gas generated inside the second combustion chamber 25 by the second igniter 27 burning the second gas generating agent 26 moves into the first combustion chamber 21 via the communication hole 46, it is possible to suppress deformation of the filter 32 outward in the radial direction in the same way as in the first example described above. Then, even in a case where the filter 32 deforms non-uniformly, causing a slight gap to occur between the inner area 321a of the upper end surface 321 and the top surface portion 2e of the upper shell 2, the flow of the combustion gas entering the gap is hindered by a contacting portion between the upper outer peripheral area 32b of the filter 32 and the small diameter peripheral wall portion 2d of the upper shell 2, and the combustion residue contained in the combustion gas can be captured in the predetermined space 36.

Thus, when the first igniter 23 burns the first gas generating agent 22, thereby generating combustion gas inside the first combustion chamber 21, and when the combustion gas generated inside the second combustion chamber 25 by the second igniter 27 burning the second gas generating agent 26 moves into the first combustion chamber 21 via the communication hole 46, it is possible to suppress the occurrence of a short path by which the combustion gas inside the first combustion chamber 21 passes through the gap between the upper end surface 321 of the filter 32 and the top surface portion 2e of the upper shell 2 and reaches the gas discharge port 5 without passing through the filter 32, and suppress, even in a case where a gap occurs, for example, the combustion residue entering the gap from reaching the gas discharge port 5 as is as well.

Figure 8:
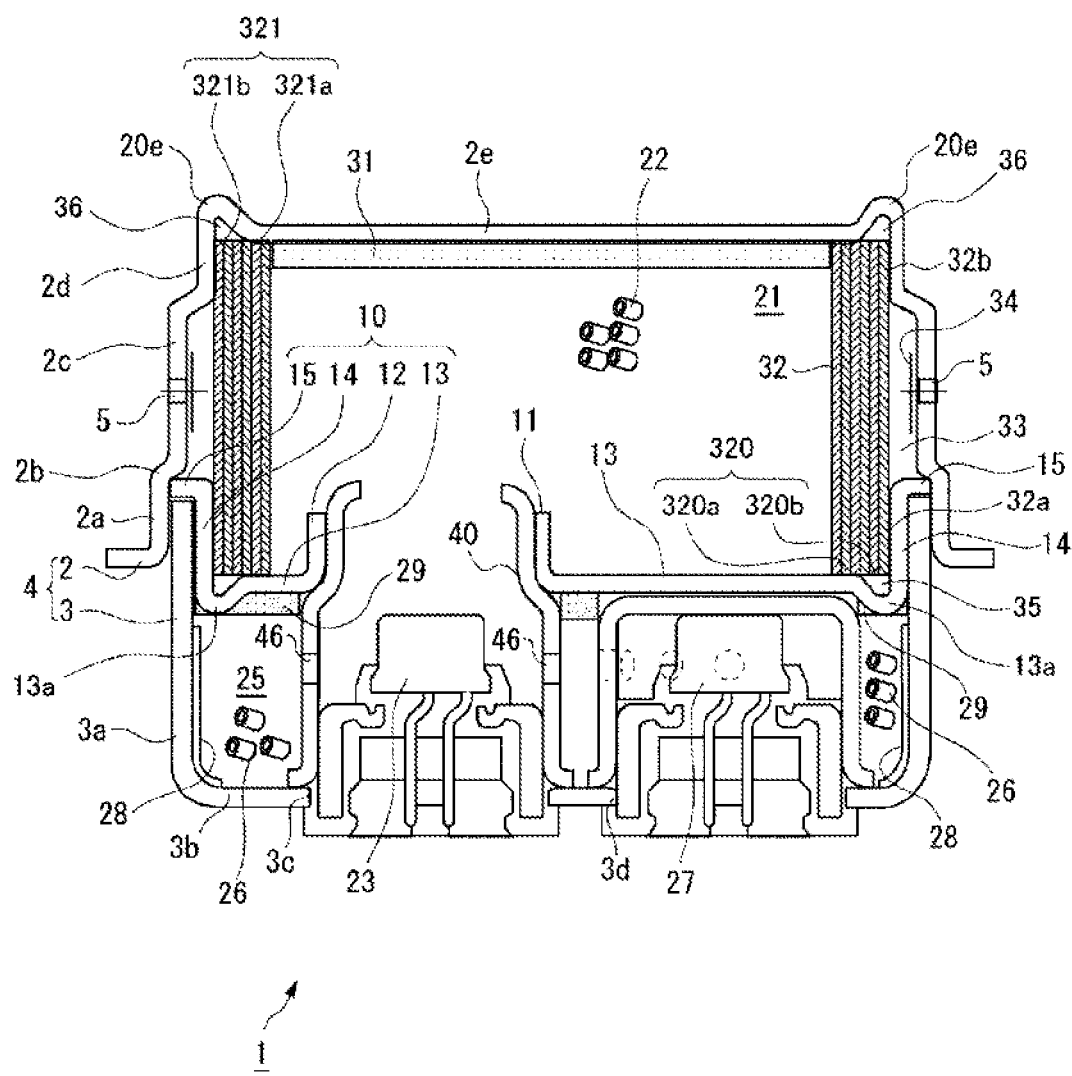
FIG. 8 is a drawing illustrating another configuration example of the gas generator in the modification example of the first example.

Note that whether the protruding portion is formed on the top surface portion 2e of the upper shell 2 or the protruding portion is formed on the dividing wall portion 13 of the vertical partition wall member 10 may be suitably selected taking into account whether the gap is readily formed on the upper end surface side or the lower end surface side of the filter 32, whether the combustion residue readily enters the gap on the upper end surface side or the gap on the lower end surface side of the filter 32, and the like. Further, from the viewpoint of more reliably suppressing a short path and collecting combustion residue, as illustrated in FIG. 8, the protruding portion 13a may be formed on the outer edge portion of the dividing wall portion 13 of the vertical partition wall member 10, and the protruding portion 20e may also be formed on the outer edge portion of the top surface portion 2e of the upper shell 2 as well, thereby positioning the filter 32 inside the housing 4 with the outer area 320b of the lower end surface 320 of the filter 32 adjacent to the predetermined space 35 and the outer area 321b of the upper end surface 321 adjacent to the predetermined space 36.

Second Example

Figure 9:
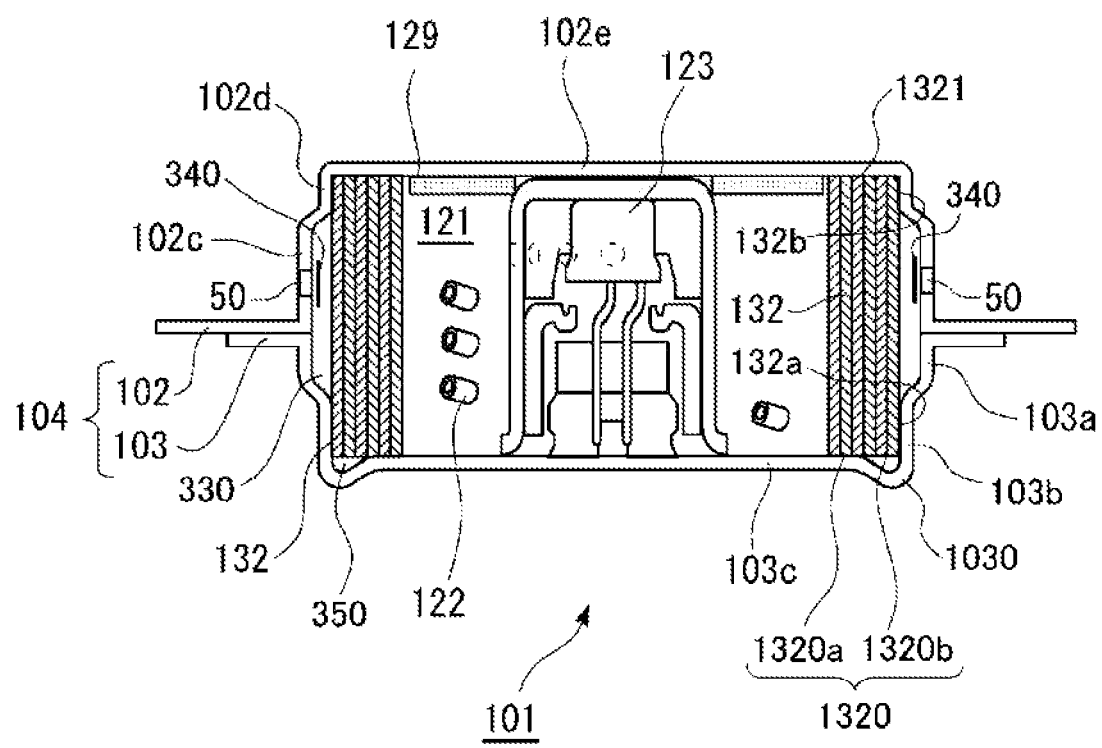
FIG. 9 is a drawing illustrating a schematic configuration of a gas generator in a second example.

The gas generator of a second example will be described on the basis of FIG. 9. FIG. 9 is a cross-sectional view in a height direction of a gas generator 101 according to the present example. The gas generator 101 illustrated in FIG. 9 is configured as a single-type gas generator in which only one combustion chamber 121 and one igniter 123 are accommodated inside a housing 104 that includes an upper shell 102 and a lower shell 103 and is formed by being fixed by welding at a flange portion.

The upper shell 102 includes a large diameter peripheral wall portion 102c, a small diameter peripheral wall portion 102d, and a top surface portion 102e, which form an internal space having a concave shape. The top surface portion 102e, together with a bottom surface portion 103c of the lower shell 103 described later, has a substantially circular shape in a top view. The large diameter peripheral wall portion 102c and the small diameter peripheral wall portion 102d surround a periphery of the top surface portion 102e, and form a wall surface having an annular shape and extending substantially perpendicularly from the top surface portion 102e. The top surface portion 102e is connected to a first end side (upper side in FIG. 9) of the small diameter peripheral wall portion 102d, and the large diameter peripheral wall portion 102c having a diameter greater than that of the small diameter peripheral wall portion 102d is connected to a second end side (lower side in FIG. 9). Then, the second end side (lower side in FIG. 9) of the large diameter peripheral wall portion 102c serves as an opening of the upper shell 102.

The lower shell 103 includes a large diameter peripheral wall portion 103a, a small diameter peripheral wall portion 103b, and the bottom surface portion 103c, which form an internal space having a concave shape. The large diameter peripheral wall portion 103a and the small diameter peripheral wall portion 103b surround a periphery of the bottom surface portion 103c, and form a wall surface having an annular shape and extending substantially perpendicularly from the bottom surface portion 103c. The first end side (upper side in FIG. 9) of the large diameter peripheral wall portion 103a serves as an opening of the lower shell 103, and the small diameter peripheral wall portion 103b having a diameter less than that of the large diameter peripheral wall portion 103a is connected to the second end side (lower side in FIG. 9). Then, the bottom surface portion 103c is connected to the second end side (lower side in FIG. 9) of the small diameter peripheral wall portion 103b. Here, the inner diameter of the large diameter peripheral wall portion 103a of the lower shell 103 is substantially the same as the inner diameter of the large diameter peripheral wall portion 102c of the upper shell 102, and the inner diameter of the small diameter peripheral wall portion 103b of the lower shell 103 is substantially the same as the inner diameter of the small diameter peripheral wall portion 102d of the upper shell 102.

The igniter 123 is disposed in a central portion of an internal space of the housing 104. A lower end portion of the igniter 123 is joined to the bottom surface portion 103c of lower shell 103, and a top end portion of the igniter 123 comes into contact with the top surface portion 102e of the upper shell 102. Thus, a space 121 having au annular shape and surrounding the igniter 123 is formed in the internal space of the housing 104. This space 121 is filled with a gas generating agent 122, and thus the combustion chamber is configured. Then, a filter 132 having an annular shape is disposed between the combustion chamber 121 and a gas discharge port 50 formed in the large diameter peripheral wall portion 102c of the upper shell 102.

The filter 132, similar to that in the first example described above, is formed by stacking flat woven meshes made of stainless steel in the radial direction and compressing the meshes in the radial and axial directions, and is configured to cool the combustion gas from the gas generating agent 122 and collect the combustion residue thereof. Further, to prevent moisture from entering the housing 104 from outside, the gas discharge port 50 is closed, by an aluminum tape 340, from the interior of the housing 104 until the gas generator 101 is actuated. Note that the gas discharge port may be formed in the large diameter peripheral wall portion 103a of the lower shell 103.

Further, in the gas generator 101 of the present example, the filter 132 is positioned inside the housing 104, and thus the combustion gas generated in the combustion chamber 121 appropriately passes through the filter 132. An outer diameter of the filter 132 in the present example is substantially the same as an inner diameter of the small diameter peripheral wall portion 102d of the upper shell 102 and an inner diameter of the small diameter peripheral wall portion 103b of the lower shell 103, and a length (height) of the filter 132 in the axial direction is formed substantially the same as a size of a gap between a lower wall surface of the top surface portion 102e of the upper shell 102 and an upper wall surface of the bottom surface portion 103c of the lower shell 103. In a state in which the upper shell 102 and the lower shell 103 are joined, the filter 132 thus formed is supported by contact by the top surface portion 102e of the upper shell 102 at an upper end surface 1321, which is the end surface of the filter 132 on the first end side (upper side in FIG. 9) in the axial direction, and supported by contact by the bottom surface portion 103c of the lower shell 103 at an inner area 1320a of a lower end surface 1320, which is the end surface on the second end side (lower side in FIG. 9), thereby positioning the filter 132 in the vertical direction inside the housing 104. On the other hand, in a state in which the upper shell 102 and the lower shell 103 are joined, the filter 132 is supported by contact by the small diameter peripheral wall portion 102d of the upper shell 102 at an outer peripheral area (upper outer peripheral area) 132b near the upper end surface 1321 of the filter 132, and supported by contact by the small diameter peripheral wall portion 103b (corresponding to the "housing peripheral wall portion" according to the present invention) of the lower shell 103 at an outer peripheral area (lower outer peripheral area) 132a near the lower end surface 1320, thereby positioning the filter 32 in the horizontal direction inside the housing 104. Further, of the lower end surface 1320 of the filter 132, an area (outer area) 1320b outward of the inner area 1320a in the radial direction forms a predetermined space 350 with a protruding portion 1030 in which an outer edge portion of the bottom surface portion 103c of the lower shell 103 protrudes outward in the axial direction (downward in FIG. 9). That is, the outer area 1320b of the lower end surface 1320 of the filter 132 is adjacent to the predetermined space 350 along the small diameter peripheral wall portion 103b of the lower shell 103. Here, the protruding portion 1030 described above may be continuously formed in the peripheral direction, or may be formed intermittently in the peripheral direction.

In the single-type gas generator 101 in which the filter 132 is thus positioned inside the housing 104, when the igniter 123 burns the gas generating agent 122, thereby generating combustion gas inside the combustion chamber 121, a force that attempts to deform the filter 132 outward in the radial direction acts in the same way as in the first example described above. However, deformation of the filter 132 outward in the radial direction in this case can be suppressed in the same way as in the first example described above. Further, even in a case where the filter 32 deforms non-uniformly, causing a slight gap to occur between the inner area 1320a of the lower end surface 1320 and the bottom surface portion 103c of the lower shell 103, the flow of the combustion gas entering the gap is hindered by a contacting portion between the lower outer peripheral area 132a of the filter 132 and the small diameter peripheral wall portion 103b of the lower shell 103, and the combustion residue contained in the combustion gas is captured in the predetermined space 350.

Accordingly, according to the gas generator 101 in the present example, when the first igniter 23 burns the first gas generating agent 122, thereby generating combustion gas inside the first combustion chamber 121, it is possible to suppress the occurrence of a short path by which the combustion gas inside the combustion chamber 121 passes through the gap between the lower end surface 1320 of the filter 132 and the bottom surface portion 103c of the lower shell 103 and reaches the gas discharge port 50 without passing through the filter 132, and suppress, even in a case where a gap occurs, for example, the combustion residue entering the gap from reaching the gas discharge port 50 as is as well.

Note that, in the single-type gas generator described above, instead of on the outer edge portion of the bottom surface portion of the lower shell, the protruding portion may be formed on the outer edge portion of the top surface portion of the upper shell, and naturally the protruding portion may be formed on both the outer edge portion of the bottom surface portion of the lower shell and the outer edge portion of the top surface portion of the upper shell.

REFERENCE SIGNS LIST 1, 101 Gas generator
2, 102 Upper shell
2c, 102c Large diameter peripheral wall portion
2d, 102d Small diameter peripheral wall portion
2e, 102e Top surface portion
3, 103 Lower shell
3b, 103c Bottom surface portion
4, 104 Housing
5, 50 Gas discharge port
10 Vertical partition wall member
13 Dividing wall portion
13a, 20e, 1030 Protruding portion
14 Mating wall portion
21 First combustion chamber
22 First gas generating agent
23 First igniter
25 Second combustion chamber
26 Second gas generating agent
27 Second igniter
32, 132 Filter
32a, 132a Lower outer peripheral area
32b, 132b Upper outer peripheral area
35, 36, 350 Predetermined space
46 Communication hole
101 Gas generator
121 Combustion chamber
122 Gas generating agent
123 Igniter
320, 1320 Lower end surface
320b, 1320b Outer area
321, 1321 Upper end surface
321b Outer area

What is claimed is:

1. A gas generator, comprising:
a housing;
an igniter disposed inside the housing;
a combustion chamber accommodating the igniter and configured to be filled with a gas generating agent to be combusted by the igniter;
a gas discharge port provided in the housing and configured to allow an inside and an outside of the housing to communicate with each other; and
a filter having a cylindrical shape, including the combustion chamber in an interior thereof, and disposed between the combustion chamber and the gas discharge port,
wherein one of the housing and a partition wall member provided inside the housing and defining the combustion chamber has a protruding portion as a reinforcing rib that protrudes away from the filter and forms a predetermined space only by said one of the housing and a partition wall member,
the filter is positioned inside the housing such that,
a portion of at least one end surface of two end surfaces in an axial direction of the filter is supported by contact with said one of the housing and the partition wall member at a position other than the protruding portion,
an outer area of the at least one end surface of the filter positioned outward in a radial direction of the portion overlaps the predetermined space, and
a predetermined outer peripheral area of an outer peripheral surface of the filter near the at least one end surface is supported by contact with a portion of the one of the housing and the partition wall member that extends along with the predetermined outer peripheral surface.

2. The gas generator according to claim 1, wherein the predetermined space is formed adjacent to the outer area along a member that comes into contact with the predetermined outer peripheral area of the filter.

3. The gas generator according to claim 2, wherein the partition wall member divides a space inside the housing into a first combustion chamber serving as the combustion chamber and positioned on a first end side in an axial direction of the housing, and a second combustion chamber positioned on a second end side in the axial direction of the housing and configured to be filled with a gas generating agent,
wherein a communication portion is provided to the partition wall member and configured to allow the first combustion chamber and the second combustion chamber to communicate with each other,
wherein the igniter is a first igniter accommodated in the first combustion chamber,
the second combustion chamber accommodates a second igniter,
wherein the filter is supported, by contact by the partition wall member, at an end surface side thereof positioned on the second end side in the axial direction of the housing, and disposed between the first combustion chamber and the gas discharge port, and
wherein the partition wall member includes,
a protruding portion protruding toward the second combustion chamber and thus causing the predetermined space to be adjacent to the outer area of an end surface of the filter on the second end side, and
a peripheral wall portion that comes into contact with the predetermined outer peripheral area near the end surface of the filter on the second end side.

4. The gas generator according to claim 2, wherein the partition wall member divides a space inside the housing into a first combustion chamber serving as the combustion chamber and positioned on a first end side in an axial direction of the housing, and a second combustion chamber positioned on a second end side in the axial direction of the housing and configured to be filled with a gas generating agent,
a communication portion provided to the partition wall member and configured to allow the first combustion chamber and the second combustion chamber to communicate with each other,
wherein the igniter is a first igniter accommodated in the first combustion chamber,
the second combustion chamber accommodates a second igniter,
the filter is supported, by contact by the housing, at an end surface side thereof positioned on the first end side in the axial direction of the housing, supported by the partition wall member at an end surface thereof positioned on the second end side in the axial direction of the housing, and disposed between the first combustion chamber and the gas discharge port, and
wherein the housing includes
a housing protruding portion protruding outward in the axial direction of the housing and thus causing the predetermined space to be adjacent to the outer area of an end surface of the filter on the first end side, and
a housing peripheral wall portion that comes into contact with the predetermined outer peripheral area near the end surface of the filter on the first end side.

5. The gas generator according to claim 2, wherein the predetermined space is formed into an annular shape in a peripheral direction of the filter.

6. The gas generator according to claim 1, wherein the partition wall member divides a space inside the housing into a first combustion chamber serving as the combustion chamber and positioned on a first end side in an axial direction of the housing, and a second combustion chamber positioned on a second end side in the axial direction of the housing and configured to be filled with a gas generating agent,
a communication portion is provided to the partition wall member and configured to allow the first combustion chamber and the second combustion chamber to communicate with each other,
wherein the igniter is a first igniter accommodated in the first combustion chamber,
the second combustion chamber accommodates a second igniter,
wherein the filter is supported, by contact by the partition wall member, at an end surface side thereof positioned on the second end side in the axial direction of the housing, and disposed between the first combustion chamber and the gas discharge port, and
wherein the partition wall member includes,
the protruding portion protruding toward the second combustion chamber and thus causing the predetermined space to be adjacent to the outer area of an end surface of the filter on the second end side, and
a peripheral wall portion that comes into contact with the predetermined outer peripheral area near the end surface of the filter on the second end side.

7. The gas generator according to claim 6, wherein the partition wall member divides a space inside the housing into a first combustion chamber serving as the combustion chamber and positioned on a first end side in an axial direction of the housing, and a second combustion chamber positioned on a second end side in the axial direction of the housing and configured to be filled with a gas generating agent,
a communication portion provided to the partition wall member and configured to allow the first combustion chamber and the second combustion chamber to communicate with each other,
wherein the igniter is a first igniter accommodated in the first combustion chamber,
the second combustion chamber accommodates a second igniter,
wherein the filter is supported, by contact by the housing, at an end surface side thereof positioned on the first end side in the axial direction of the housing, supported by the partition wall member at an end surface thereof positioned on the second end side in the axial direction of the housing, and disposed between the first combustion chamber and the gas discharge port, and
wherein the housing includes
a housing protruding portion protruding outward in the axial direction of the housing and thus causing the predetermined space to be adjacent to the outer area of an end surface of the filter on the first end side, and
a housing peripheral wall portion that comes into contact with the predetermined outer peripheral area near the end surface of the filter on the first end side.

8. The gas generator according to claim 6, wherein the predetermined space is formed into an annular shape in a peripheral direction of the filter.

9. The gas generator according to claim 1, wherein
the partition wall member divides a space inside the housing into a first combustion chamber serving as the combustion chamber and positioned on a first end side in an axial direction of the housing, and a second combustion chamber positioned on a second end side in the axial direction of the housing and configured to be filled with a gas generating agent,
wherein a communication portion is provided to the partition wall member and configured to allow the first combustion chamber and the second combustion chamber to communicate with each other,
wherein the igniter is a first igniter accommodated in the first combustion chamber,
the second combustion chamber accommodates a second igniter,
wherein the filter is supported, by contact by the housing, at an end surface side thereof positioned on the first end side in the axial direction of the housing, supported by the partition wall member at an end surface thereof positioned on the second end side in the axial direction of the housing, and disposed between the first combustion chamber and the gas discharge port, and
wherein the housing includes
the protruding portion protruding outward in the axial direction of the housing and thus causing the predetermined space to be adjacent to the outer area of an end surface of the filter on the first end side, and
a housing peripheral wall portion that comes into contact with the predetermined outer peripheral area near the end surface of the filter on the first end side.

10. The gas generator according to claim 9, wherein
the predetermined space is formed into an annular shape in a peripheral direction of the filter.

11. The gas generator according to claim 1, wherein
the filter is supported, by contact by the housing, at the at least one end surface and disposed between the combustion chamber and the gas discharge port, and
the housing includes,
a housing protruding portion protruding outward in the axial direction of the housing and thus causing the predetermined space to be adjacent to the outer area of the at least one end surface of the filter, and
a housing peripheral wall portion that comes into contact with the predetermined outer peripheral area near the at least one end surface of the filter.

12. The gas generator according to claim 11, wherein
the predetermined space is formed into an annular shape in a peripheral direction of the filter.

13. The gas generator according to claim 1, wherein
the predetermined space is formed into an annular shape in a peripheral direction of the filter.

14. The gas generator according to claim 1, wherein
a gap having an annular shape and connected to the gas discharge port is formed between at least a portion of an area of the outer peripheral surface of the filter other than the predetermined outer peripheral area and the housing.

15. The gas generator according to claim 1, wherein
another predetermined outer peripheral area of the outer peripheral surface of the filter near another one of the at least one end surface is supported by a direct contact with an inner peripheral surface of the housing.

* * * * *